United States Patent [19]

Nakajima et al.

[11] Patent Number: 5,227,971
[45] Date of Patent: Jul. 13, 1993

[54] APPARATUS FOR AND METHOD OF SELECTING A TARGET LANGUAGE EQUIVALENT OF A PREDICATE WORD IN A SOURCE LANGUAGE WORD STRING IN A MACHINE TRANSLATION SYSTEM

[75] Inventors: Hiroyuki Nakajima, Kyoto; Hiroyuki Kaji, Tama, both of Japan

[73] Assignee: Hitachi, Ltd., Tokyo, Japan

[21] Appl. No.: 366,668

[22] Filed: Jun. 14, 1989

[30] Foreign Application Priority Data

Jun. 15, 1988 [JP] Japan .................. 63-145713

[51] Int. Cl.$^5$ ............................................. G06F 15/38
[52] U.S. Cl. ...................................................... 364/419
[58] Field of Search ................. 364/419, 900 MS File, 364/200 MS File

[56] References Cited

U.S. PATENT DOCUMENTS

| | | | |
|---|---|---|---|
| 4,635,199 | 1/1987 | Muraki | 364/900 |
| 4,916,614 | 4/1990 | Kaji et al. | 364/900 |
| 5,020,021 | 5/1991 | Kaji et al. | 364/900 |

FOREIGN PATENT DOCUMENTS 63-132379 10/1988 Japan .

Primary Examiner—Roy N. Envall, Jr.
Assistant Examiner—X. Chung
Attorney, Agent, or Firm—Fay, Sharpe, Beall, Fagan, Minnich & McKee

[57] ABSTRACT

An apparatus for and a method of selecting a target language equivalent of a predicate word in a source language word string for use in a machine translation system in which use is made of a dictionary having records, each including data on an entry word of a predicate source language word, on predicate target language words equivalent to the entry source language word and on semantic features of non-predicate words related to a case governed by the predicate target language words or including data on an entry word of a non-predicate source language word, on a non-predicate target language word equivalent to the entry source language word and on semantic features of the non-predicate target language word. A processor is coupled to the dictionary for fetching therefrom the semantic feature data of the non-predicate words serving as arguments for the case governed by the predicate target language words equivalent to the predicate word in the source language word string and the semantic feature data of one of the non-predicate target language words which is equivalent to the non-predicate word in the source language word string, carrying out numerical operations between the fetched data to provide a plurality of operation results, and selecting one of the operation results according to predetermined criteria and determining that one of the predicate target language words which has the data of the non-predicate words providing the selected operation result as the target language equivalent of the source language predicate word.

23 Claims, 5 Drawing Sheets

| ENTRY WORD IN JAPANESE ~41 | PART OF SPEECH ~42 | ENGLISH EQUIVALENT(S) ~43 | SEMANTIC FEATURE VECTOR(S) ~44a,44b | CASE FRAME ~45 |
|---|---|---|---|---|
| 破る (yabu ru) | VERB | tear | 0 -1 1 | AGENT-が-S (ga)　OBJECT-を-D (o) |
| | | defeat | 1 1 -1 | AGENT-が-S (ga)　OBJECT-を-D (o) |
| | | break | 1 -1 -1 | AGENT-が-S (ga)　OBJECT-を-D (o) |
| 紙 (kami) | NOUN | paper | -1 -1 1 | |
| 敵 (teki) | NOUN | enemy | 1 1 -1 | |
| 約束 (yaku soku) | NOUN | rule | 1 -1 -1 | |

FIG. 6

| 41 ENTRY WORD IN JAPANESE | 42 PART OF SPEECH | 43 ENGLISH EQUIVALENT(S) | 46 CASE | 471 WEIGHTS FOR 44a IN DICTION-ARY5 | 472 WEIGHTS FOR RECORD INDUCTION | 44a, 44b SEMANTIC FEATURE VECTOR(S) | 45 CASE FRAME |
|---|---|---|---|---|---|---|---|
| 破る (yabu ru) | VERB | tear | AGENT | 0 | 0 | 0 1 0 | AGENT-が-S (ga) OBJECT-を-D (o) |
| | | | OBJECT | 1 | 100 | 0 -1 -1 | |
| | | defeat | AGENT | 0 | 0 | 0 1 0 | AGENT-が-S (ga) OBJECT-を-D (o) |
| | | | OBJECT | 1 | 100 | -1 0 -1 | |
| | | break | AGENT | 0 | 0 | 0 1 0 | AGENT-が-S (ga) OBJECT-を-D (o) |
| | | | OBJECT | 1 | 100 | -1 -1 0 | |
| 紙 (kami) | NOUN | paper | — | — | — | -1 -1 1 | — |

FIG. 7

| 51 VERB IN JAPANESE | 52 NOUN IN JAPANESE | 53 VERB IN ENGLISH | 55 CASE | 54 NOUN IN ENGLISH |
|---|---|---|---|---|
| 破る (yabu ru) | 窓ガラス (mado ga ra su) | break | OBJECT | window |
| 破る (yabu ru) | 犬 (Inu) | tear | AGENT | dog |

APPARATUS FOR AND METHOD OF SELECTING A TARGET LANGUAGE EQUIVALENT OF A PREDICATE WORD IN A SOURCE LANGUAGE WORD STRING IN A MACHINE TRANSLATION SYSTEM

BACKGROUND OF THE INVENTION

The present invention relates to an apparatus for and method of selecting a target language equivalent of a predicate word such as a verb or adjective in a source language word string for use in a machine translation system, the source language word string including the predicate word and a non-predicate word such as a noun associated with the predicate word.

A method using a co-occurrence relation between words is effective for selection of a target language equivalent in a machine translation system. This method is, however, associated with the problem that a large amount of co-occurrence relation knowledge need be expressed and stored in a memory. Such a problem is solved by expressing a co-occurrence relation as a word-concept relation and storing, in a thesaurus, general-specific concept relation of words, for example as in Japanese Patent Laid-Open Publication JP-A-63-132379 (laid open on Jun. 4, 1988).

However, it is generally difficult to construct the thesaurus itself because of a necessity to properly select a word of general concept having a plurality of words of specific concept in a co-occurrence relation to the former.

SUMMARY OF THE INVENTION

It is an object of the present invention to provide an apparatus for and method of selecting a target language equivalent in a machine translation system by using a co-occurrence knowledge expressed with a small number of semantic features, without constructing a complicated thesaurus.

According to one aspect of the present invention, a word dictionary is used which contains a plurality of records each including (a) data on, or corresponding to, an entry word in a source language which is predicate, (b) data on a target language word which is predicate and is equivalent to the entry word, and (c) data, in the form of a set of numerical values, on semantic features of a plurality of non-predicate words with respect to, or related to, a case governed by the target language word which is predicate for the entry word being predicate, or (a) data on an entry word in a source language which is non-predicate, (b) data on a target language word which is non-predicate and is equivalent to the entry word, and (c) data, in the form of a set of numerical values, on a semantic feature of the target language word which is non-predicate for the entry word being non-predicate. A processor coupled to the word dictionary fetches therefrom a semantic feature data of the plurality of non-predicate words serving as the arguments for a case governed by the predicate target word equivalent to the predicate word in the source language word string and a semantic feature data of one of the non-predicate target language words which is equivalent to the non-predicate word in the source language word string, carries out numerical operations between the fetched data to provide a plurality of operation results, and selects one of the operation results in accordance with predetermined criteria and determines one of the predicate target language words equivalent to the predicate word in the source language word string which has the data of the non-predicate words providing the selected result as the target language equivalent of the source language predicate word.

The above-described semantic feature data is a semantic feature vector having a plurality of components. The above-described operation results are representative of the degree of similarity between the semantic feature vector of a plurality of non-predicate words serving as the argument for a case governed by the predicate target language word and the semantic feature vector of the predicate target language word.

According to another aspect of the present invention, a co-occurrence relation between a predicate word and a non-predicate word serving as an argument in a case governed by the predicate word in a machine translation system can be expressed by a semantic feature vector. Therefore, the co-occurrence relation can be expressed with a reduced number of general semantic features. Further, both the co-occurrence relation expressed by semantic features and a co-occurrence relation between predicate words and non-predicate words serving as the argument for a case governed by the predicate words may be used in selecting a target language equivalent, resulting in less co-occurrence relation data to be stored.

BRIEF DESCRIPTION OF THE DRAWINGS

FIG. 6 shows an example of the contents of records in a word dictionary which can be used in another embodiment of this invention.

FIG. 7 shows an example of the contents of a record in a co-occurrence relation dictionary which can be used together with the word dictionary shown in FIG. 6.

DESCRIPTION OF THE PREFERRED EMBODIMENTS

In the following preferred embodiments, a Japanese-English machine translation system using Japanese as a source language and English as a target language will be described by way of example.

Figure 1:
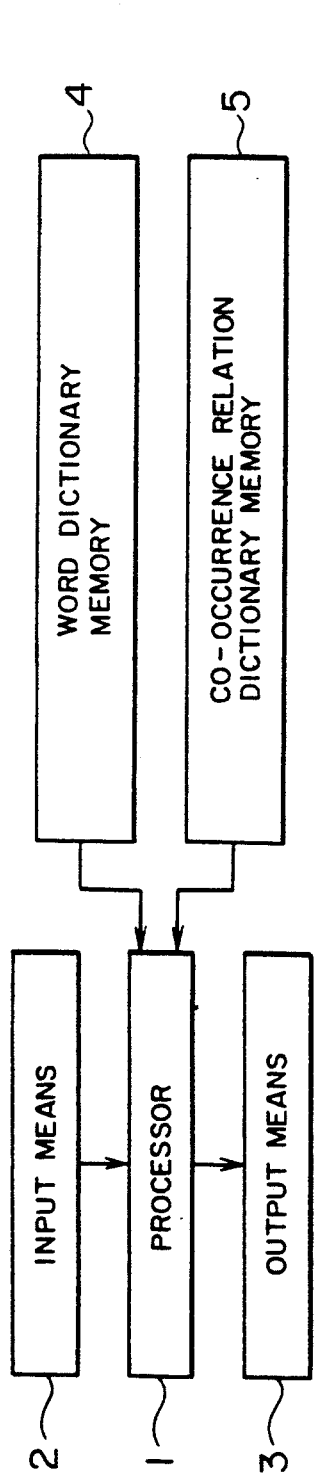
FIG. 1 shows the hardware arrangement of an embodiment of a Japanese-English machine translation system according to the present invention.

FIG. 1 shows the hardware arrangement of the embodiment machine translation system which includes a processor 1, input means 2 for input of a Japanese language word string, output means 3 for output of an English language word string, word dictionary memory 4, and, if necessary, co-occurrence relation dictionary memory 5.

The processor 1 may be constructed of a general computer, mini-computer, 32 bit microprocessor or the like. The memories 4 and 5 may use, for example, a magnetic disk.

Figure 2:
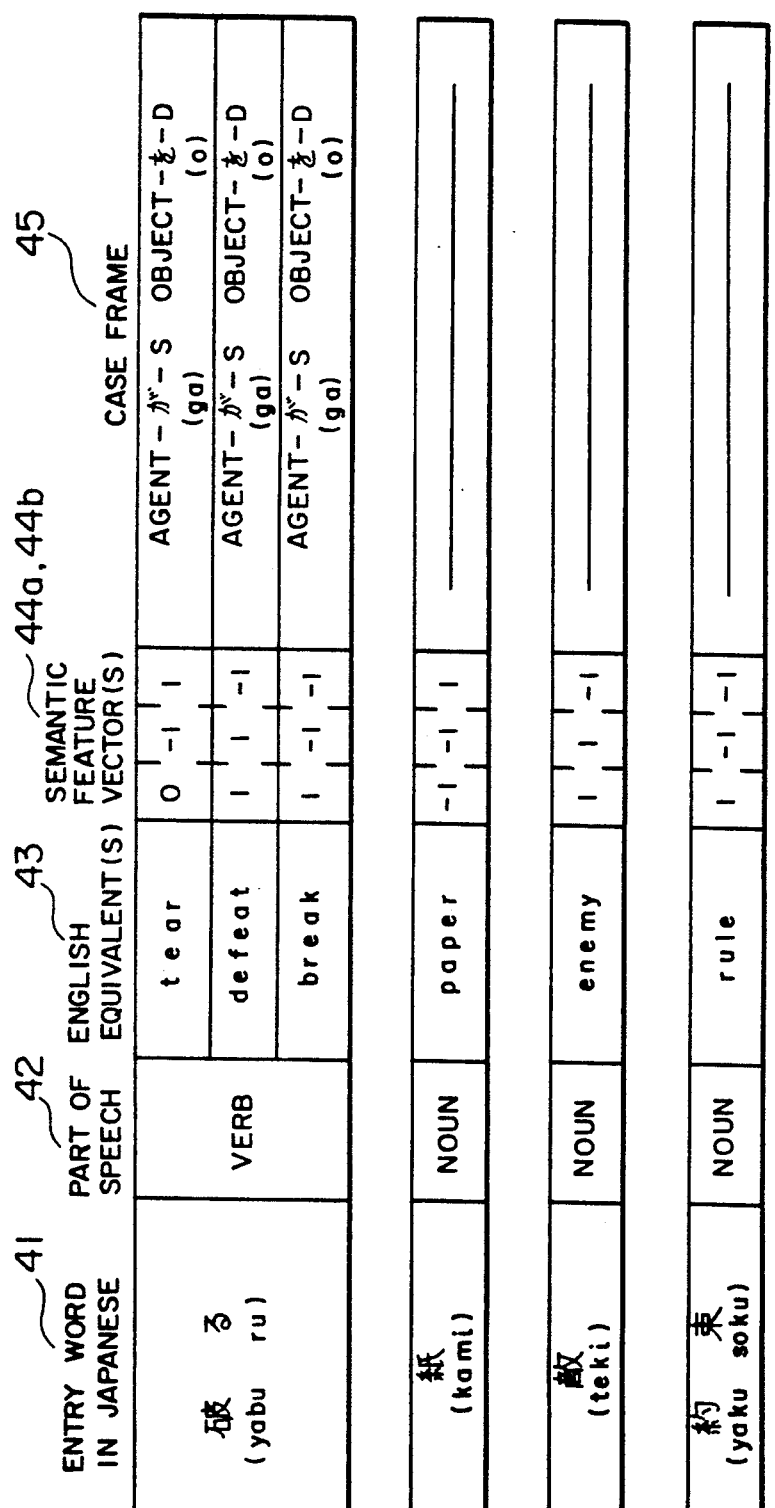
FIG. 2 shows an example of the contents of records in a word dictionary which can be used in the embodiment of this invention.

A word dictionary in the word dictionary memory 4 is constructed of a plurality of records such as shown in FIG. 2. Each record may include data 41 on an entry word in Japanese, data 42 on a part of speech, data 43 on one or more English equivalents of the entry word, data 44a on a semantic feature vector (for predicate entry word 41) or data 44b on a semantic feature vector (for non-predicate entry word 41), and data 45 on a case frame. Defined by the case frame 45 for the predicate entry word 41 (e.g., the part of speech of which is a verb or an adjective) are cases governed by respective English equivalents, Japanese article for each case, and a syntactic role of the English equivalent for each case. Each record can be searched using the Japanese entry word 41 as a search key. The semantic feature vector 44a, 44b has a plurality of components (e.g., three components). The semantic feature item for each component is determined so as to have an effective nature in discriminating between English words. Needless to say, the semantic feature items for each vector are common to all English equivalents. For instance, the first, second and third components represent semantic feature items [LIMITATION], [WILL] and [FLAT FACE], respectively. For the non-predicate entry word 41 (e.g., the part of speech of which is a noun), the semantic feature vector 44b in the record is defined with respect to the English equivalent 43 of the entry word 41. The values of the first, second and third components of the semantic feature vector 44b are set for "+1" if the English equivalent 43 has the first, second and third component semantic features respectively, and "−1" if not. The semantic feature vector for the predicate entry word 41 (e.g., the part of speech of which is a verb or adjective) in the record is defined with respect to English equivalents of a plurality of non-predicate words serving as a case governed by the entry word, and the values of the first, second and third components are set for "+1" if the English equivalents of the plurality of non-predicate words have predominantly the semantic features of the first, second and third components respectively, "−1" if not, and "0" in other cases (the cases where they may be or may not be considered to have the semantic features under consideration). Namely, the semantic feature vector 44a for the predicate entry word 41 in a record represents a predominant semantic feature for a collection of non-predicate English equivalents serving as the arguments for one or more cases governed by the respective English equivalents 43, so that it concisely expresses a co-occurrence relation of each of a plurality of English equivalents 43 of the predicate entry word 41. Records in the word dictionary 4 are arranged therein in the order which follows a predetermined rule, irrespective of whether an entry word is predicate or non-predicate.

Examples of how to determine values of components of semantic feature vectors 44a and 44b will now be described below.

Semantic feature items or components of the semantic feature vectors and the number of the items or components of each vector may be optionally decided. In the described embodiment, the semantic feature items or components are [LIMITATION], [WILL] and [FLAT FACE], and therefore the number of the semantic feature items or components of each vector is three (3).

Referring to the semantic feature vector 44b of a non-predicate target language word 43, for example, "paper" which is equivalent to a non-predicate entry word 41 in the source language in one record, it has no meaning with respect to the first component [LIMITATION] and the value for the first component may be "−1", it has no meaning with respect to the second component [WILL] and the value for the second component may be "−1", and it has meaning with respect to the third component [FLAT FACE] and the value for the third component may be "1". Thus, the semantic feature vector of non-preciate word "paper" may be (−1, −1, 1), as shown in FIG. 2.

Reference will next be made to the semantic feature vectors 44a of non-predicate words serving as arguments for a case governed by a predicate target language words 43 which are equivalent to a predicate entry word 41 in the source language in one record.

For a predicate target language word equivalent to a predicate entry word in the source language for which there is a large amount of co-occurrence information with respect to government by the predicate target language word, the values for the components (here, the number of the components for each vector being assumed to be three, [LIMITATION], [WILL] and [FLAT FACE], as stated above) may be determined as follows. Taking, for example, a predicate target language word "tear", there are many arguments for cases governed by the verb "tear". Here, it is assumed that only the object case is considered for simplicity's sake, although there are other cases such as the agent case, etc. that are governed by that verb. Various arguments for the object case governed by "tear" may be "a letter", "a coat", "an envelope", "an agreement", etc. Values for the three components are determined for each of the arguments in a manner stated above with respect to the vectors 44b as described below.

|          | [LIMITATION]<br>1st component | [WILL]<br>2nd component | [FLAT FACE]<br>3rd component |
|----------|---|---|---|
| letter   | −1 | −1 | 1 |
| coat     | −1 | −1 | 1 |
| envelope | 1  | −1 | 1 |
| agreement| 1  | −1 | 1 |
| SUM      | 0  | −4 | 4 |

The sum of the values for the respective arguments is determined for each component of the vector. Since the sum for the first component is 0, the first component of the semantic feature vector of arguments (i.e., a plurality of non-predicate words serving as arguments) for the object case governed by the verb "tear" may be "0".

The sum for the second component is −4. Since it is negative, the second component of the arguments for the object case governed by "tear" may be "−1". Since the sum for the third component is 4 which is positive, the third component of the arguments for the object case governed by "tear" may be "1". In this manner, the semantic feature vector of non-predicate words serving as arguments for a case governed by the predicate target language word "tear" equivalent to a predicate source language word "ya-bu-ru" may be determined as (0, −1, 1).

For a predicate target language word equivalent to a predicate entry word in the source language for which there is rather a small amount of co-occurrence information with respect to government by the predicate target language word, the values for the three components [LIMITATION], [WILL] and [FLAT FACE] may be determined by any other way with three-level numbers (−1, 0 and 1) from a common sense standpoint.

Figures 3, 4:
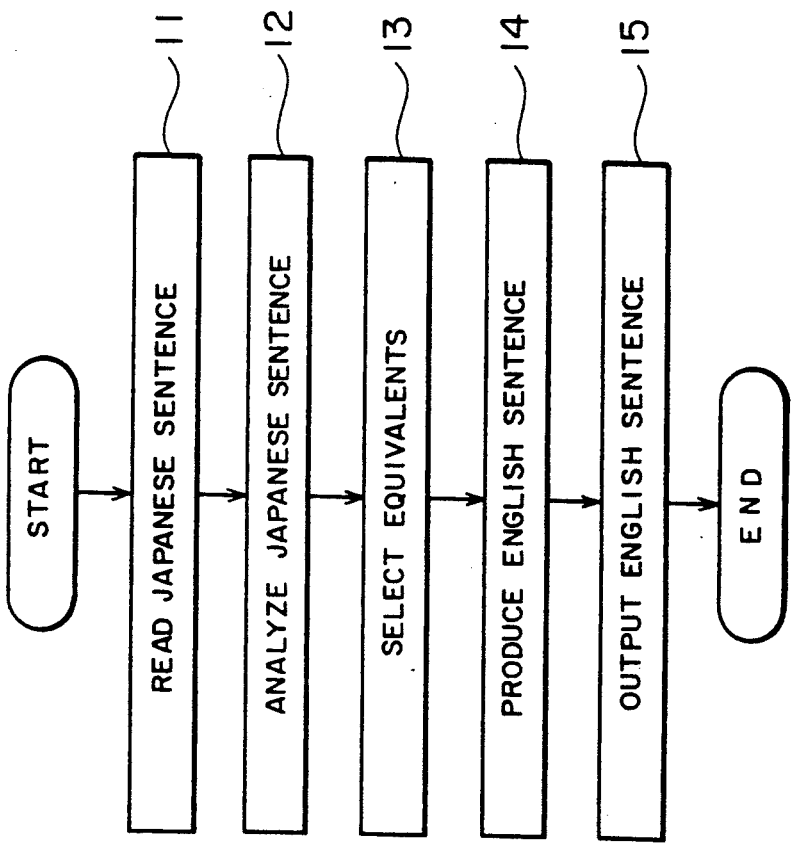
FIG. 3 shows an example of the contents of a record in a co-occurrence relation dictionary which can be used together with the word dictionary shown in FIG. 2.
FIG. 4 is a flow chart showing the outline of a procedure performed by the Japanese-English machine translation system.

The co-occurrence relation dictionary in the co-occurrence relation dictionary memory 5 is constructed of a plurality of records, one example of which is shown in FIG. 3. Each record may include a data 51 on an entry word in a Japanese predicate word (e.g., a verb), data 52 on a Japanese non-predicate word (e.g., a noun) in a co-occurrence relation to the entry word 51, data 53 on an English equivalent of the entry word 51, and data 54 on an English equivalent of the word 52. Each record can be searched using a combination of a Japanese predicate word 51 and Japanese non-predicate word as a search key.

The co-occurrence relation dictionary may use a dictionary disclosed in, for example, U.S. Ser. No. 922,889 filed Oct. 24, 1986 (A. Okajima et al) entitled "METHOD AND SYSTEM FOR GENERATING LEXICON OF COOCCURRENCE RELATIONS IN NATURAL LANGUAGE" and assigned to the same assignee of the present invention.

The co-occurrence relation dictionary is a supplemental dictionary to the word dictionary, which stores therein, if necessary, pairs of predicate words and non-predicate words in a typical co-occurrence relation to each other.

The value of the semantic feature vector at each dimension is represented by a two-level number or 3-level number, but it may be represented by a multi-level (more than 3-level) number.

Next, a translation procedure to be executed by the processor 1 will be described with reference to FIG. 4. First, a Japanese sentence (Japanese word string) including a predicate word (e.g., a verb) and a non-predicate word (e.g., a noun) is read with input means 2 (step 11). The read-out Japanese sentence is divided into segments (morphological analysis), the word dictionary 4 is searched to find records each having an entry word corresponding to a verb in the Japanese sentence and an entry word corresponding to a noun having an object case, and an intermediate representation as a collection of words in a semantic relation to each other is obtained through a known syntax analysis including a pattern matching of the tree structure of the Japanese sentence including the verb with the case frame 45 of the searched record including the entry word 41 of the verb (step 12). Next, with reference to the word dictionary 4 only or both the word dictionary 4 and co-occurrence relation dictionary 5, and in accordance with the degree of similarity between a plurality of semantic feature vectors 44a in the searched record including the entry word of the verb and the semantic feature vector 44b of the searched record including the entry word of the noun, and if necessary by using information in the co-occurrence relation dictionary, a target language equivalent is selected (step 13). The detail of selecting a target language equivalent will be given later. Thereafter, with reference to the word dictionary 4, and in accordance with the case frame of the English equivalent of the verb, the syntactic role of the non-predicate English translation equivalent serving as the argument for a case governed by the verb is determined, to thus form an English sentence (step 14). Lastly, the obtained English sentence is outputted from output means 3 (step 15).

Figure 5:
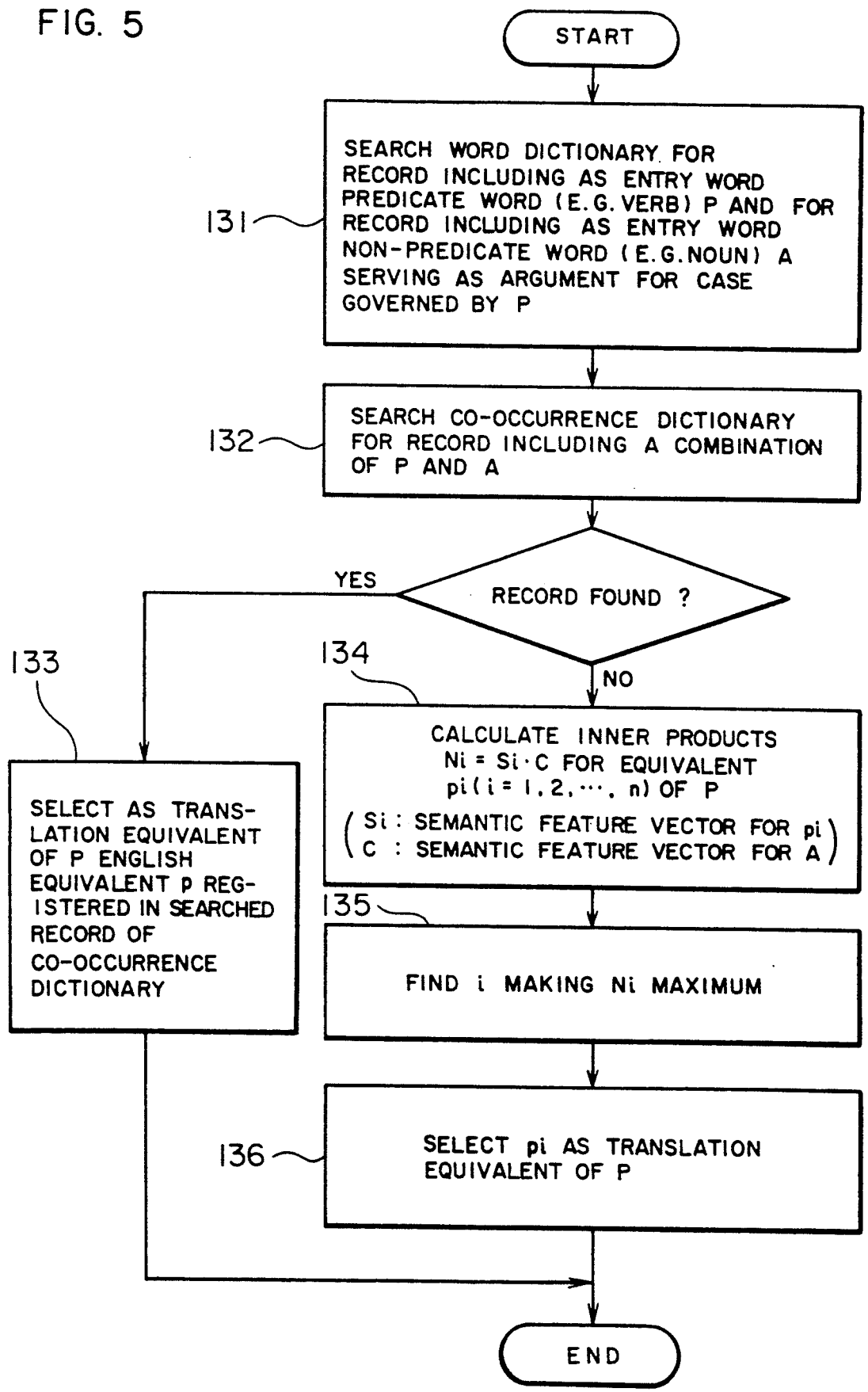
FIG. 5 is a flow chart showing a target language equivalent selection procedure according to an embodiment of this invention.

Next, the procedure of selecting a target language equivalent by using both the word dictionary shown in FIG. 2 and the co-occurrence relation dictionary shown in FIG. 3 will be described with reference to FIG. 5.

An input sentence is assumed as "紙を破る(Kami o yaburu)". The records have been searched from the word dictionary 4 at step 12 shown in FIG. 4, the records including as an entry word a verb "破る (yaburu)" (represented by a symbol P) which is a predicate word in the input sentence and as an entry word a noun "紙(kami)" (represented by a symbol A) which is a non-predicate word in the input sentence (step 131 in FIG. 5). In the exemplary word dictionary shown in FIG. 2, one or more English translation equivalents 43 are given in the record having a predicate entry word 41, and one English translation equivalent is given in the record having a non-predicate entry word 41.

Next, using as a search key a combination of the verb P and noun A in the input sentence, the co-occurrence relation dictionary in the memory 5 is searched (step 132). If there is a record whose search key is a combination of the verb P and noun A in the co-occurrence relation dictionary, the English verb p stored in the English verb field 53 in the searched record is selected as a translation equivalent of the verb P in the input sentence (step 133).

If there is no record whose search key is a combination of the verb P and noun A in the co-occurrence relation dictionary, then in accordance with the data in the records read out at step 131 from the word dictionary, the values of inner products $N_i = S_i \cdot C$ ($i = 1, \ldots, n$) are calculated, where $S_i, \ldots, S_n$ each represents a semantic feature vector of each of a plurality of English translation equivalents 43 serving as target translation candidates $p_1, \ldots, p_n$ in the record having as the entry word the verb P, and C represents a semantic feature vector in the record including as the entry word the noun A. The semantic feature vectors $S_i, \ldots, S_n$ are representative of the predominant semantic feature of a plurality of non-predicate English words (e.g., English words of noun) serving as the arguments for the cases governed by the plurality of English translation equivalents. Each of the inner products $N_1, \ldots, N_n$ represents a degree of similarity between each of the semantic feature vectors $S_1, \ldots, S_n$ and the semantic feature vector C. Since there is no record having as the search key a combination of "破る(yaburu)" and "紙(kami)" in the co-occurrence relation dictionary 3 shown in FIG. 3, the values of the inner products $N_1 = S_1 \cdot C$, $N_2 = S_2 \cdot C$, $N_3 = S_3 \cdot C$ are calculated in accordance with the data in the word dictionary 4 (step 134), where the semantic feature vectors $S_1$, $S_2$ and $S_3$ represent the predominant semantic feature of a plurality of non-predicate English words serving as the arguments for the cases governed by the translation equivalent candidates for "破る (yaburu)" including "tear" (symbol $p_1$), "defeat" (symbol $p_2$) and "break" (symbol $p_3$). Lastly, obtained is a value i which makes the inner product $N_i$ maximum (step 135) to then select as a target language equivalent of the verb P the symbol $p_i$ (step 136). According to the word dictionary shown in FIG. 2, $S_1 = (0, -1, 1)$, $S_2 = (1, 1, -1)$, and $S_3 = (1, -1, -1)$, and $C = (-1, -1, 1)$. Therefore, the values of $N_1$, $N_2$ and $N_3$ are 2, −3 and −1, respectively, so that $p_1 =$ "tear" is selected as the target language equivalent of P. If inner products of the same value are present, the target language equivalent may be selected in the order of target language equivalents stored in the dictionary.

In the case of an input sentence "窓ガラス を 破る (Mado-garasu o yaburu)", the co-occurrence relation dictionary 5 includes therein a record having as the search key a combination of the predicate word "(yaburu)" and "窓ガラス(mado-garasu) in the input sentence, so that the English translation equivalent verb "break" stored in the record is selected as the translation equivalent of the "破る(yaburu)".

In the above embodiment, for the purpose of simplicity, a semantic feature vector of a verb is defined with respect to one case (object case). However, a verb generally governs a plurality of cases. Therefore, it can be considered that a semantic feature vector is defined with respect to each of the plurality of cases, and the degree of similarity for each case with the semantic feature of a record having as the entry word a non-predicate word in the word dictionary 4 is calculated, to then select a translation equivalent based on the total sum of all inner products.

Figure 8:
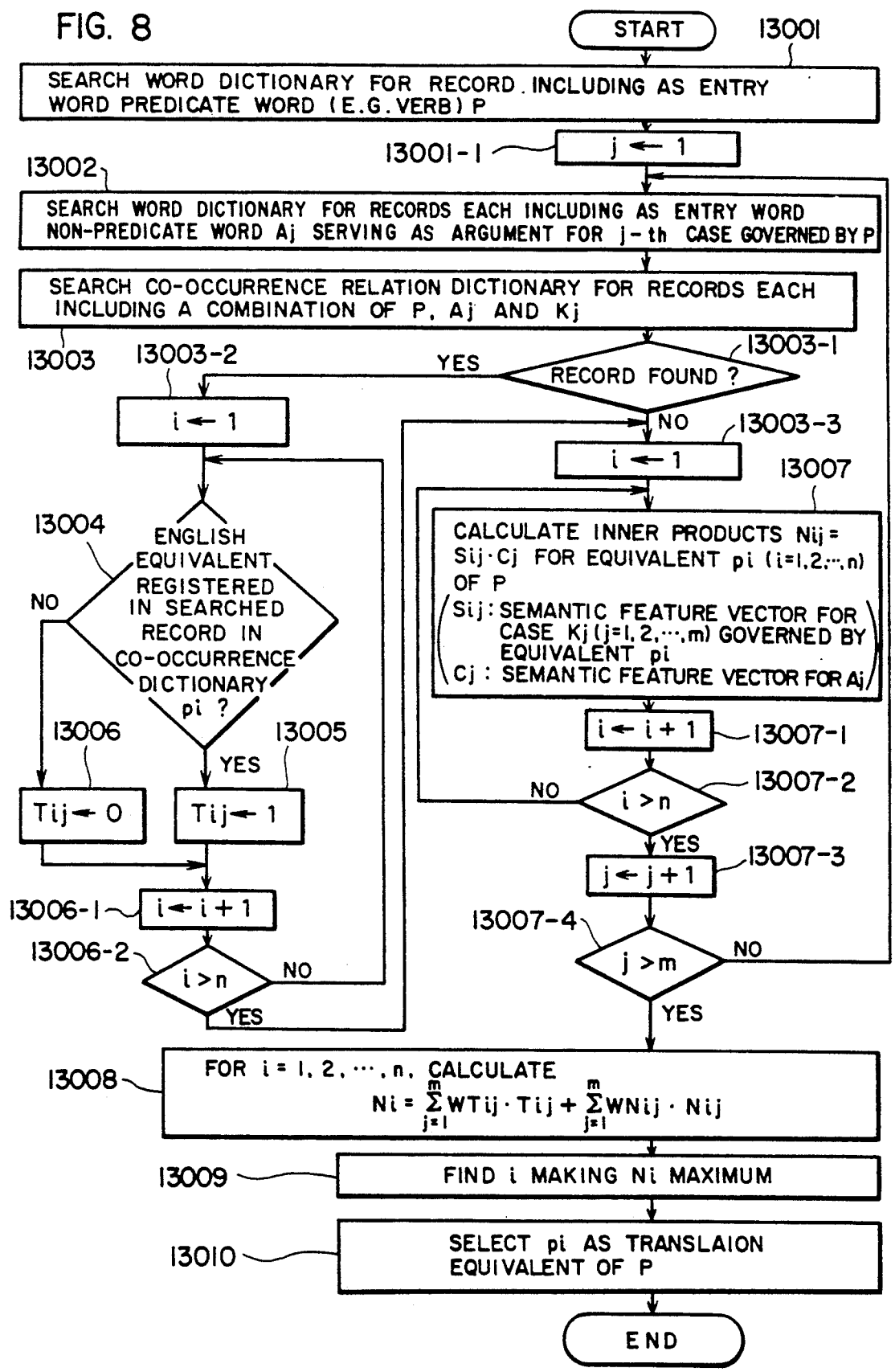
FIG. 8 is a flow chart showing a target language equivalent selection procedure according to another embodiment of this invention.

An embodiment using the above principle will be described with reference to FIGS. 6 to 8.

FIGS. 6 and 7 show examples of the contents of records in the word dictionary and co-occurrence relation dictionary in the same manner as in FIGS. 2 and 3.

Each record in the co-occurrence relation dictionary shown in FIG. 7 includes, in addition to the data of the record shown in FIG. 3, a data on a case (55) associated with the entry word 51 (Japanese word verb) for Japanese word noun 52 (a non-predicate source language word in a co-occurrence relation to a predicate source language entry word 51).

On the other hand, in the word dictionary shown in FIG. 6, each record having a predicate entry word 41 includes, in addition to the data of the record shown in FIG. 2, a data on a plurality of semantic feature vectors 44a with respect to a plurality of cases 46 (agent case and object case in FIG. 6) governed by respective English translation equivalents 43, a data on the cases, a data on weight 471 for the case 46 (i.e., cases governed by English translation equivalents 43), and a data on the weight 472 for a record in the co-occurrence relation dictionary including data 51, 55 and 53 identical with data 41, 46 and 43, respectively in a record in the word dictionary (shown in FIG. 7).

Next, the procedure of selecting a target translation language equivalent will be described with reference to FIG. 8 like FIG. 5. For the purpose of simplicity, the description is given on the assumption that a predicate word is a verb, and a non-predicate word is a noun.

Searching the word dictionary, a record having as the search key a verb P in the input sentence is read (step 13001). A noun serving as an argument for a j-th case Kj governed by P in the input sentence is represented by Aj (j = 1, 2, . . . , m). In the example shown in FIG. 6, m=2, K₁=AGENT, and K₂=OBJECT. Strictly speaking, the entry word verb 41 does not necessarily govern all the stored cases (K₁, K₂, ..., Kₘ) in the input Japanese sentence. It is therefore reasonable to perform the search of word dictionary (step 13002) and the search of the co-occurrence dictionary (step 13003) both to be described later, only for the number j of the case governed by P in the input Japanese sentence (a loop of j=1 to m). Accordingly, steps 13002 to 13007 are repeated for j=1 to m (number of cases governed by P) (steps 13001-1, 13007-3, 13007-4). Searching the word dictionary 4, a record having $A_j$ as the search key is read therefrom (step 13002). Using a combination of P, $A_j$ and $K_j$ as the search key, the co-occurrence relation dictionary 5 is searched (step 13003). It is judged whether or not a record searched at step 13003 is present in the co-occurrence relation dictionary 5 (step 13003-1). If present, step 13003-2 follows, and if not present, step 13003-3 follows. Steps 13004 to 13006 are repeated for i = 1 to n (number of target language equivalents of P) (steps 13003-2, 13004-1, 13004-2). In the example shown in FIG. 6, n=3, $P_1$=tear, $p_2$=defeat, and $p_3$=break. It is judged whether or not the English word verb field in the record having as the search key a combination of P, $A_j$ and $K_j$ is $p_i$ (step 13004). If $p_i$, step 13005 follows, and if not, step 13006 follows. A source $T_{ij}$ (numerical representation of whether or not there exists in the co-occurrence relation dictionary a record including $p_i$ as an English equivalent governing case $k_j$) with respect to a co-occurrence relation of a word associated with the case $k_j$ governed by the translation equivalent candidate $p_i$ is set, e.g., at 1. Namely, a co-occurrence relation of $p_i$ relative to $A_j$ through the case $K_j$ in the co-occurrence relation dictionary is represented as $T_{ij}=1$ (step 13005). $T_{ij}$ is set at 0 (step 13006). Step 13007 is repeated for i=1 to n (steps 13007-1, 13007-2). The inner products $N_{ij}=S_{ij} \cdot C_j$ are calculated (at step 10037), where $S_{ij}$ represents a semantic feature vector (data 44a in the word dictionary record) for the case $K_j$ of the translation candidate $p_i$ of P, and $C_j$ represents a semantic feature vector of $A_j$. The inner products $N_{ij}$ represent a score with respect to a co-occurrence relation represented by a semantic feature associated with the case $k_j$ governed by the translation equivalent candidate $p_i$. For i=1 to n, $$N_i = \sum_{j=1}^{m} WT_{ij} \cdot T_{ij}$$

$$1 + \sum_{j=1}^{m} WN_{ij} \cdot N_{ij}$$

is calculated (step 13008), where $WT_{ij}$ represents, as indicated at 472 in FIG. 6, a weight for a case for the numerical representation $T_{ij}$ of the case data 55 in the co-occurrence relation dictionary record, and $WN_{ij}$ represents, as indicated at 442 in FIG. 6, a weight for a case for the semantic feature vectors $S_{ij}$ and $C_j$ in the word dictionary record (refer to FIG. 6).

The reason why $WT_{ij}$ and $WN_{ij}$ are provided is as follows.

Namely, generally in selecting a target language equivalent using a co-occurrence relation, all the cases are not related, but there is a specific case which is mainly used in selecting a target language equivalent (in most cases an object case). In view of this, a contribution of the case $K_j$ in selecting a translation equivalent is expressed by $WT_{ij}$ and $WN_{ij}$.

Further, a co-occurrence relation on the semantic feature level is less important for the translation equivalent selection than the co-occurrence relation on the word level (in the above embodiments, a co-occurrence relation on the word level is preferentially used). Therefore, by setting as $WT_{ij} \gg WN_{ij}$, a co-occurrence relation on the word level can be preferentially used.

The result of calculation of $N_i$ as in the above equation indicates a degree of correctness of the translation equivalent $p_i$ (step 13008). Then, the value i making $N_i$ maximum is obtained (step 13009). $p_i$ is used as the translation equivalent of P (step 13010). It is to be noted in FIG. 8 that if $WT_{i1}-WN_{i1}=0$ (i=1 to 3), i.e., if the agent case is not related, and if $WT_{i2}>>WN_{i2}$ (i=1 to 3), i.e., if a co-occurrence relation on the word level is preferentially used, the equivalent processes to those shown in FIG. 5 can be performed.

According to the above embodiments, the data amount stored in a dictionary can be reduced considerably as compared with the case where all pairs of words are stored in a co-occurrence relation dictionary, by storing in the form of semantic feature vectors which represent a predominant semantic feature of a plurality of non-predicate target language words (e.g., noun) serving as arguments for a case governed by a predicate target language word (e.g., verb). Further, an optimum translation equivalent of a predicate source language word can be selected with an improved translation quality, by ordering the properness of translation equivalent candidates upon calculation of the inner products of the semantic feature vectors.

We claim:

1. An apparatus for selecting a target language equivalent of a predicate word in a source language word string for use in a machine translation system, said source language word string including the predicate word and an associated non-predicate word, the apparatus comprising:
   memory means for storing therein a plurality of records, each record including a first data corresponding to an entry word in a source language which is predicate or non-predicate, a second data corresponding to at least one target language word which is predicate or non-predicate and is equivalent to said entry word, and one of a third data, in the form of a first set of numerical values, corresponding to semantic features of a plurality of non-predicate words related to at least one case governed by at least one predicate target language word equivalent to said entry word for said entry word being predicate and a fourth data, in the form of a second set of numerical values, corresponding to a semantic feature of at least one non-predicate target language word equivalent to said entry word for said entry word being non-predicate; and,
   processor means coupled to said memory means, the processor means including
   means for fetching therefrom the third data of said plurality of non-predicate words serving as arguments for said at least one case governed by the at least one predicate target language word equivalent to the predicate word in said source language word string and the fourth data of one of the non-predicate target language words which is equivalent to the associated non-predicate word in said source language word string,
   means for carrying out numerical operations between said fetched third data and said fetched fourth data to provide a plurality of operation results,
   means for selecting one of said operation results according to predetermined criteria, and
   means for determining said target language equivalent of said source language predicate word in said source language word string by determining which of the at least one predicate target language words has a corresponding third data providing said selected operation result.

2. The apparatus according to claim 1, wherein said third and fourth data are semantic feature vectors each having a plurality of components.

3. The apparatus according to claim 2, wherein each of said components is represented by a multi-level value number.

4. The apparatus according to claim 2, wherein each of said components of said third data is represented by a three-level value number and each of said components of said fourth data is represented by a two-level value number.

5. The apparatus according to claim 1, wherein said third data to be fetched from said memory means includes data on one case governed by said at least one predicate target language word equivalent to the predicate word in said source language word string.

6. The apparatus according to claim 1, wherein said third data to be fetched from said memory means includes data on a plurality of cases governed by said at least one predicate target language word equivalent to the predicate word in said source language word string.

7. The apparatus according to claim 6, wherein said each of those records in said memory in which said first data entry words are predicate further includes a fifth data representative of weights, each weight corresponding to one of said plurality of cases governed by said at least one predicate target language word equivalent to the predicate word in said source language word string.

8. The apparatus according to claim 7, further comprising second memory means for storing therein a plurality of second records, each second record including a sixth data corresponding to an entry word in the source language which is predicate, a seventh data corresponding to a non-predicate word in the source language in a co-occurrence relation with said sixth data entry word, an eighth data corresponding to a predicate target language word equivalent to said sixth data entry word, a ninth data corresponding to a non-predicate target language word equivalent to said seventh data non-predicate word and a tenth data corresponding to a case of said seventh data non-predicate word, said processor means being also coupled to said second memory means and including means for fetching said eighth data in each of those of said second records in which said predicate and non-predicate source language words and the case of said non-predicate source language word hit the sixth, seventh and tenth data, respectively; and wherein each of those records in the first-mentioned memory means in which said first data entry words are predicate further includes an eleventh data representative of weights, each weight corresponding to the case of said seventh data non-predicate word in one of said second records in said second memory, said processor means including means for carrying out numerical operations between the fifth data and said operation results and numerical operations between said eleventh data and a numerical representation of whether there exists a second record including said hit sixth, seventh and tenth data.

9. The apparatus according to claim 1, further comprising second memory means for storing therein a plurality of second records, each second record including a sixth data corresponding to an entry word in the source language which is predicate, a seventh data corresponding to an associated non-predicate word in the source language in a co-occurrence relation with said sixth data entry word, an eighth data corresponding to a predicate target language word equivalent to said sixth data entry word and a ninth data corresponding to a non-predicate target language word equivalent to said seventh data non-predicate word, said processor means being also coupled to said second memory means and including means for fetching from said second dictionary said eighth data in that one of said second records in which said predicate and non-predicate words in said source language word string hit the sixth and seventh data, respectively, so that said eighth data target language word equivalent to the sixth data entry word in said second record is selected as said target language equivalent of said source language predicate word in preference to said second data predicate target language words.

10. The apparatus according to claim 1, wherein said criteria for selection of one operation result is such that the operation result to be selected has a largest value among the operation results.

11. A machine translation system for translating a source language word string to a corresponding target language word string, the source language word string including a predicate word and an associated non-predicate word, the system comprising:

input means for inputting a source language word string;

a first dictionary for storing therein a plurality of first records, each first record including a first data corresponding to an entry word in a source language which is predicate or non-predicate, a second data corresponding to at least one target language word which is predicate or non-predicate and is equivalent to said entry word, and one of a third data, in the form of a first set of numerical values, corresponding to semantic features of a plurality of non-predicate words related to at least one case governed by at least one predicate target language word, equivalent to said entry word for said entry word being predicate and a fourth data, in the form of a second set of numerical values, corresponding to a semantic feature of at least one non-predicate target word equivalent to said entry word for said entry word being non-predicate;

a second dictionary for storing therein a plurality of second records, each second record including a sixth data corresponding to an entry word in the source language which is predicate, a seventh data corresponding to an associated non-predicate word in the source language in a co-occurrence relation with said sixth data entry word, an eighth data corresponding to a predicate target language word equivalent to said sixth data entry word and a ninth data corresponding to a non-predicate target language word equivalent to said seventh data non-predicate word;

processing means coupled to said input means and said first and second dictionaries for reading out data therefrom to provide a target language word string, said processing means including means for fetching from said first dictionary the third data of said plurality of non-predicate words serving as arguments for said case governed by the at least one predicate target language word equivalent to the predicate word in said source language word string and the fourth data of one of the non-predicate target language words which is equivalent to the associated non-predicate word in said source language word string and for carrying out numerical operations between said fetched third data and said fetched fourth data to provide a plurality of operation results, means for selecting one of said operation results according to predetermined criteria and for determining which of the at least one predicate target language words has a corresponding third data providing said selected operation result thereby providing said target language equivalent of said source language predicate word in said source language word string, and, means for fetching from said second dictionary said eighth data in that one of said second records in which said predicate and non-predicate words in said source language word string hit the sixth and seventh data, respectively, so that said eighth data target language word equivalent to the sixth data entry word in said second record is selected as said target language equivalent of said source language predicate word in preference to said second data predicate target language words; and, output means coupled to said processing means for outputting the target language word string.

12. A method of selecting an equivalent of a predicate word in a source language word string by the use of a dictionary in machine translation, the dictionary being operatively coupled with a processor, said source language word string including the predicate word and an associated non-predicate word, said dictionary having a plurality of records, each record including a first data corresponding to an entry word in a source language which is predicate or non-predicate, a second data corresponding to at least one target language word which is predicate or non-predicate and is equivalent to said entry word, and one of a third data, in the form of a first set of numerical values, corresponding to semantic features of a plurality of non-predicate words related to at least one case governed by at least one predicate target language word equivalent to said entry word for said entry word being predicate and a fourth data, in the form of a second set of numerical values, corresponding to a semantic feature of at least one non-predicate target language word equivalent to said entry word for said entry word being non-predicate, the method comprising steps of:

finding by the processor, in said dictionary, the third data of the plurality of non-predicate words in one of said records which includes, for the first data entry word, the predicate word in said source language word string;

finding by the processor, in said dictionary, the fourth data of the non-predicate target language word in one of said records which includes, for the first data entry word, the associated non-predicate word in said source language word string;

carrying out, by the processor, numerical operations between the numerical values of said found third and fourth data to provide a plurality of operation results;

selecting, by the processor, one of said operation results according to predetermined criteria; and, determining, by the processor, as a target language equivalent of said predicate word in said source language word string, one of said predicate target language words equivalent to said predicate source language word which has a corresponding third data providing said selected operation result.

13. The method according to claim 12, wherein said third and fourth data are semantic feature vectors, each having a plurality of components.

14. The method according to claim 13, wherein each of said components is represented by a multi-level value number.

15. The method according to claim 13, wherein each of said components of said third data is represented by a three-level value number and each of said components in said fourth data is represented by a two-level value number.

16. The method according to claim 15, wherein said numerical operations provide a plurality of inner products between semantic feature vectors of said third and fourth data having three-level numbers.

17. The method according to claim 12, wherein said third data to be found in said dictionary includes data on one case governed by said at least one predicate target language word equivalent to the predicate word in said source language word string.

18. The method according to claim 12, wherein said third data to be found in said dictionary includes data on a plurality of cases governed by said at least one predicate target language word equivalent to the predicate word in said source language word string.

19. The method according to claim 12, wherein said criteria for selection of one operation result is such that the operation result to be selected has a largest value among the operation results.

20. A method of selecting an equivalent of a predicate word in a source language word string by the use of first and second dictionaries in machine translation, each of the first and second dictionaries operatively coupled with a processor, said source language word string including the predicate word and an associated non-predicate word, said first dictionary having a plurality of first records, each first record including a first data corresponding to an entry word in a source language which is predicate or non-predicate, a second data corresponding to at least one target language word which is predicate or non-predicate and is equivalent to said entry word, and one of a third data, in the form of a first set of numerical values, corresponding to semantic features of a plurality of non-predicate words related to at least one case governed by at least one predicate target language word equivalent to said entry word for said entry word being predicate and a fourth data, in the form of a second set of numerical values, corresponding to a semantic feature of at least one non-predicate target language word equivalent to said entry word for said entry word being non-predicate, said second dictionary having a plurality of second records, each second record including a fifth data corresponding to an entry word in the source language which is predicate, a sixth data corresponding to an associated non-predicate word in the source language in a co-occurrence relation with said fifth data entry word, a seventh data corresponding to a predicate target language word equivalent to said fifth data entry word and an eighth data corresponding to a non-predicate target language word equivalent to said sixth data non-predicate word, the method comprising the steps of:

searching, by the processor, said first dictionary for a one first record which includes a first data corresponding to said predicate source language word and for another first record that includes a first data corresponding to said non-predicate source language word;

searching, by the processor, said second dictionary for a one second record which includes a fifth data corresponding to said predicate source language word and a sixth data corresponding to said associated non-predicate source language word;

if said second record is found in said dictionary in said second searching step, determining, by the processor, as said target language equivalent of said predicate word in said source language word string, the predicate target language word defined by the seventh data in said found second record in said second dictionary;

if said second record is not found in said dictionary in said second searching step, carrying out, by the processor, numerical operations between the numerical values of the third data in said searched first record including a first data corresponding to said predicate source language word and the numerical values of said fourth data in said searched first record including a first data corresponding to said non-predicate source language word to provide a plurality of operation results;

selecting, by the processor, one of said operation results according to predetermined criteria; and, determining, by the processor, as said target language equivalent of said predicate word in said source language word string, one of said predicate target language words equivalent to said predicate source language word which has a corresponding third data providing said selected operation result.

21. A method of selecting an equivalent of a predicate word in a source language word string by the use of first and second dictionaries in machine translation, said first and second dictionaries being operatively coupled with a processor, said source language word string including the predicate word and an associated non-predicate word, said first dictionary having a plurality of first records, each first record including a first data corresponding to an entry word in a source language which is predicate or non-predicate, a second data corresponding to at least one target language word which is predicate or non-predicate and is equivalent to said entry word, and one of a third data, in the form of a first set of numerical values, corresponding to semantic features of a plurality of non-predicate words related to at least one case governed by at least one predicate target language word equivalent to said entry word for said entry word being predicate, and a fourth data, in the form of a second set of numerical values, corresponding to a semantic feature of at least one non-predicate target language word equivalent to said entry word for said entry word being non-predicate and a fifth data representative of weights, each weight corresponding to one of said plurality of cases governed by said at least one predicate target language word equivalent to the predicate word in said source language word string, said second dictionary having a plurality of second records, each second record including a sixth data corresponding to an entry word in the source language which is predicate, a seventh data corresponding to an associated non-predicate word in the source language in a co-occurrence relation with said sixth data entry word, an eighth data corresponding to a predicate target language word equivalent to said sixth data entry word, a ninth data corresponding to a non-predicate target language word equivalent to said seventh data non-predicate word and a tenth data corresponding to a case of said seventh data non-predicate word, each of those records in said first dictionary in which said first data entry words are predicate further including an eleventh data representative of weights, each weight corresponding to the case of said seventh data non-predicate word in one of said second records in said second dictionary, the method comprising the steps of:

searching said first dictionary, by the processor, for a one first record which includes a first data corresponding to said predicate source language word and for another first record which includes a first data corresponding to said non-predicate source language word;

searching said second dictionary, by the processor, for second records each of which includes a fifth data corresponding to said predicate source language word, a sixth data corresponding to said non-predicate source language word and a tenth data corresponding to the case of said non-predicate source language word;

carrying out, by the processor, first numerical operations between the numerical values of the third data in said searched first record and the numerical values of said fourth data in said searched first record to provide a plurality of first operation results;

carrying out, by the processor, second numerical operations, for each predicate target language word defined by the second data in said searched first record, between said first operation results and the weights of said fifth data in said searched first record and third numerical operations between said weights of said eleventh data in said searched first record and a numerical representation of the tenth data in said searched second record;

obtaining, by the processor, for said each predicate target language word defined by the second data in said searched first record, a sum of said second numerical operations result and said third numerical operations result;

selecting, by the processor, one of said sums according to predetermined criteria; and, determining, by the processor, as said target language equivalent of said predicate word in said source language word string, one of said predicate target language words equivalent to said predicate source language word which has a corresponding third data providing said selected operation result.

22. A method for selecting a target language equivalent of a source language word string, the source language word string comprising a source predicate word and a source non-predicate word, the method being useful in a system comprising a first dictionary including combinations of selected source predicate and non-predicate words and co-occurrence target equivalents thereof, a second dictionary comprising at least one first record and at least one second record, the first record comprising the source predicate word, at least one target predicate word and at least one first semantic feature vector, each first semantic feature vector corresponding to the target predicate words and indicating a nature of each of the target predicate words, the second record comprising the source non-predicate word, a corresponding target non-predicate word, and a corresponding second semantic feature vector indicating a nature of the target non-predicate word, the method performed by a processor, the method comprising the steps of:

inputting the source language word string comprising the source predicate and non-predicate words;

searching the combinations of the first dictionary to determine if a combination matches the source predicate and non-predicate words;

selecting the co-occurrence target equivalents corresponding to the combination as the target language equivalent if a match occurs;

searching the second dictionary to obtain the first and second records respectively comprising the source predicate word and the source non-predicate word if no match occurs;

calculating respective inner products of the second semantic feature vector included in the second record with the each first semantic feature vectors included in the first record;

determining which of the at least one target predicate words corresponds to a larger inner product; and, selecting that target predicate word as the target language equivalent.

23. An apparatus for selecting a target language equivalent of a source language word string, the source language word string comprising a source predicate word and a source non-predicate word, the apparatus useful in a system comprising a first dictionary including combinations of selected source predicate and non-predicate words and co-occurrence target equivalents thereof, a second dictionary comprising at least one first record and at least one second record, the first record comprising the source predicate word, at least one target predicate word and at least one first semantic feature vector, each first semantic feature vector corresponding to the target predicate words and indicating a nature of each of the target predicate words, the second record comprising the source non-predicate word, a corresponding target non-predicate word, and a corresponding second semantic feature vector indicating a nature of the target non-predicate word, the apparatus comprising:

means for inputting the source language word string comprising the source predicate and non-predicate words;

means for searching the combinations of the first dictionary to determine if a combination matches the source predicate and non-predicate words;

means for selecting the co-occurrence target equivalents corresponding to the combination as the target language equivalent if a match occurs;

means for searching the second dictionary to obtain the first and second records respectively comprising the source predicate word and the source non-predicate word if no match occurs;

means for calculating respective inner products of the second semantic feature vector including in the second record with the each first semantic feature vectors included in the first record;

means for determining which of the at least one target predicate words corresponds to a largest inner product; and, means for selecting that target predicate word as the target language equivalent.

* * * * *